J. SHAW.
INTERNAL COMBUSTION ENGINE.
APPLICATION FILED APR. 17, 1915.
1,188,496.
Patented June 27, 1916.
2 SHEETS—SHEET 1.
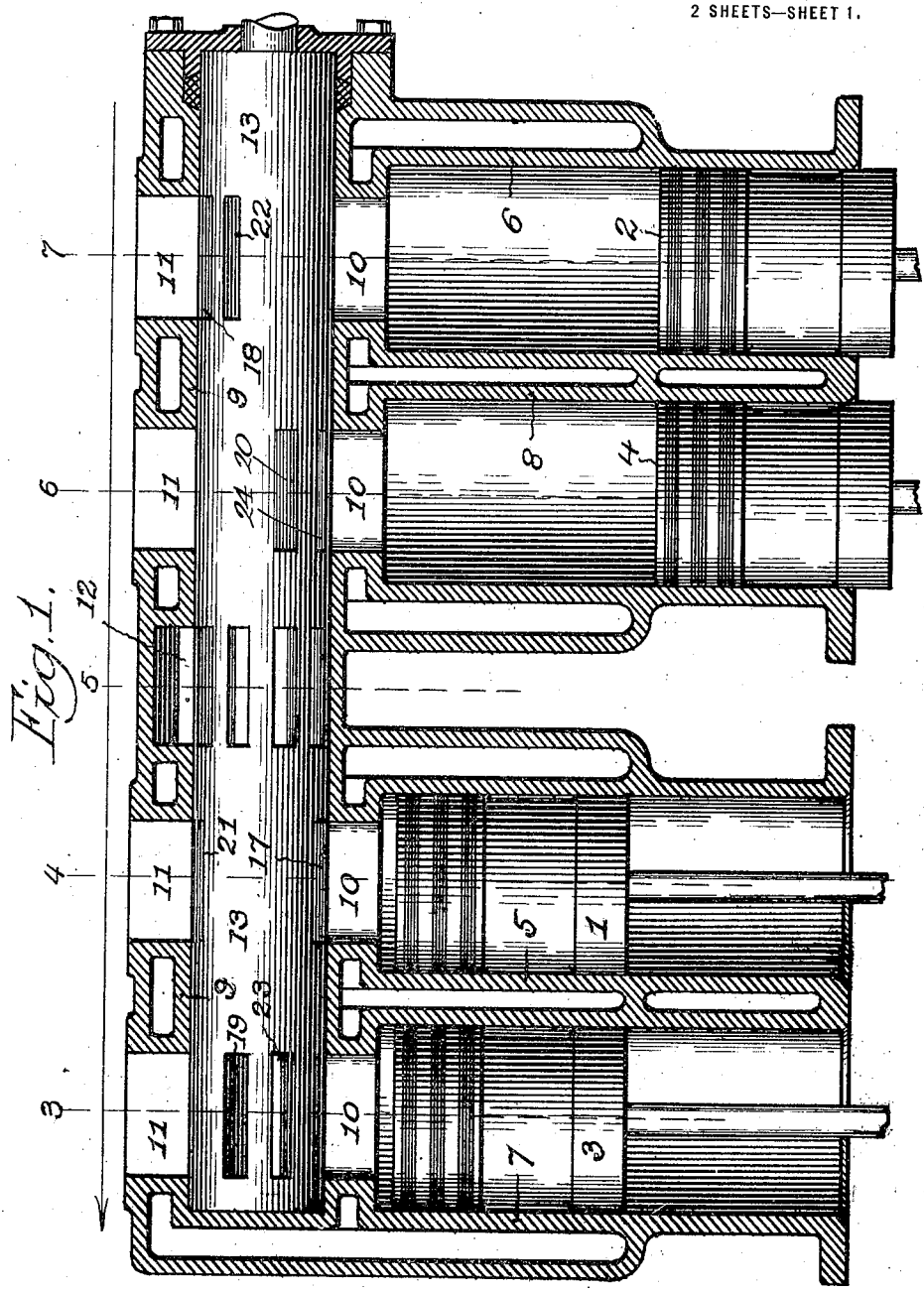
Witness
John Enders
Inventor:
James Shaw,
by Roberts Burns
Atty.

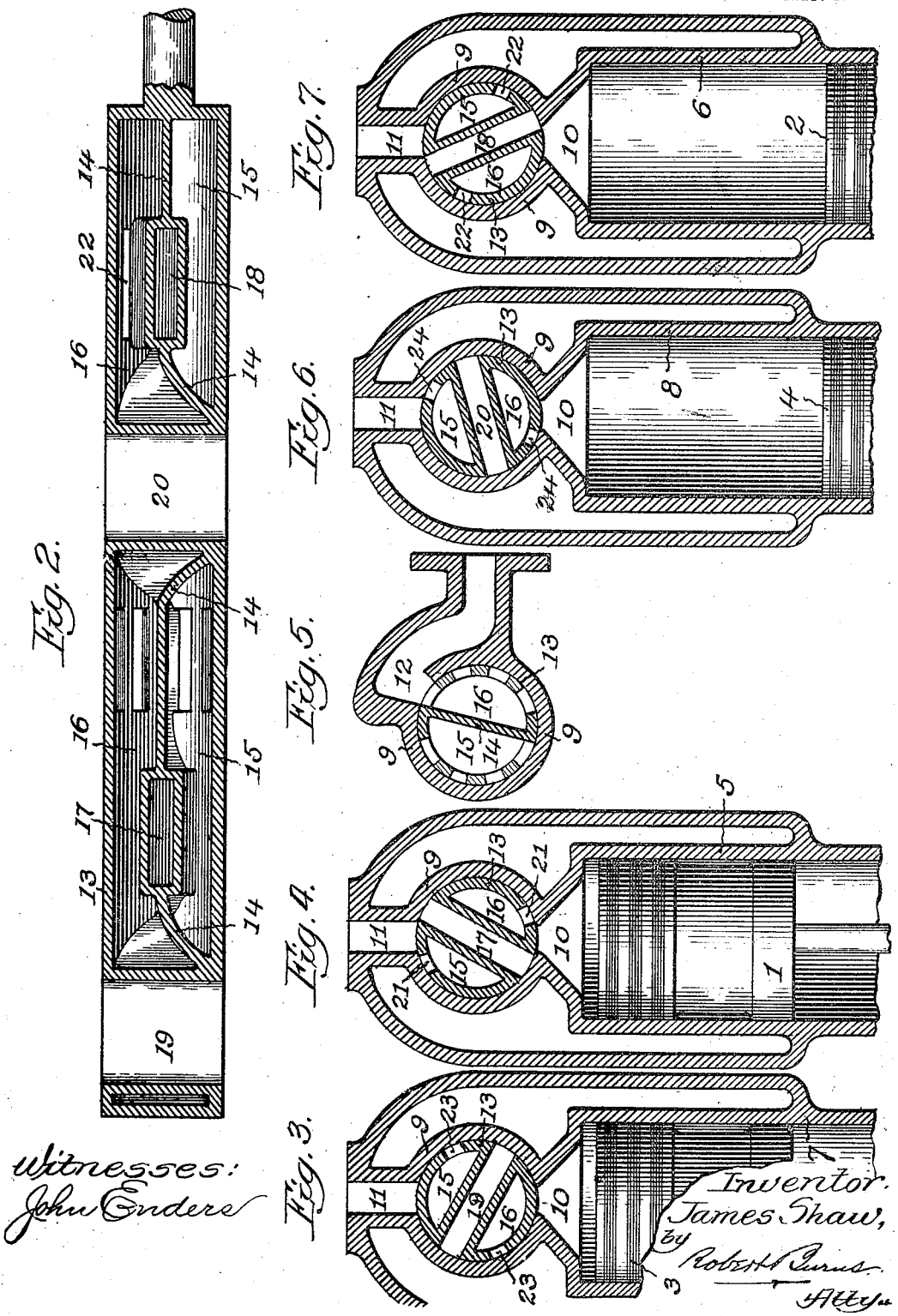

UNITED STATES PATENT OFFICE.

JAMES SHAW, OF LODI, CALIFORNIA.

INTERNAL-COMBUSTION ENGINE.

1,188,496. Specification of Letters Patent. Patented June 27, 1916.

Application filed April 17, 1915. Serial No. 21,948.

*To all whom it may concern:*

Be it known that I, JAMES SHAW, a citizen of the United States of America, and a resident of Lodi, in the county of San Joaquin, State of California, have invented certain new and useful Improvements in Internal-Combustion Engines, of which the following is a specification.

This invention relates to that class of multi-cylinder internal combustion engines of the four-cycle type in which the inlet and exhaust are controlled by a rotary valve. And the present improvement has for its object to provide a simple and efficient structural formation of rotary valves for multi-cylinder engines, in which the usual timing of the exhaust, inlet, compression, and explosion strokes of the individual pistons of the series of engine cylinders are attained in a simple and effective manner, with a direct supply of the gaseous fuel to the series of combustion chambers and a like exhaust of the exploded fuel charges from said chambers and with which a slow revolution of the valve as compared with that of the engine shaft is attained in an effective and durable manner, all as will hereinafter more fully appear.

In the accompanying drawings: Figure 1, is a longitudinal sectional elevation of the upper portion of a four cylinder internal combustion engine to which the present valve mechanism is applied. Fig. 2, is a horizontal section of the rotary valve member, detached. Figs. 3, 4, 5, 6 and 7, are detail transverse sections on lines 3, 4, 5, 6 and 7, respectively, Fig. 1.

Similar reference numerals indicate like parts in the several views.

Referring to the drawings 1, 2, 3 and 4, designate the series of pistons of an internal combustion engine, and 5, 6, 7 and 8 the series of cylinders thereof, preferably of the water-jacketed type, and having explosion or combustion chambers at their upper ends as shown. Said series of cylinders are preferably arranged in pairs and with each pair in separate relation as shown and for the purpose hereinafter set forth. The series of pistons, 1, 2, 3, and 4 are connected by the usual pitmen with the main or crank shaft of the engine, and in the drawings the reference numerals 1, 2, 3 and 4 are applied to the series of pistons in the order in which they are timed for operation.

9 designates a valve housing associated with the aforesaid series of engine cylinders and preferably disposed at the upper end of the same. In the present improvement the valve housing 9, extends the length of the series of engine cylinders 4, 5, 6, and 7 and is formed with a series of inlet-outlet ports or passages, 10, connecting the cavity of said valve housing with the combustion chambers of said cylinders.

11 designates a series of individual outlet or exhaust passages formed in the valve housing 9, preferably in diametrically alined relation to the above described series of inlet-outlet ports 10 and adapted for intermittent registration therewith by the rotary valve member, hereinafter described.

12 designates a gaseous fuel inlet port or passage formed midway the length of the valve housing 9, and adjacent to the before described space which separates the pairs of engine cylinders 7, 5 and 8, 6 as illustrated in Fig. 1. Said fuel inlet passage 12 opens into the cavity of the valve housing 9 at one side of the same as shown in Fig. 5, and is adapted in the continued operation of the engine to have alternate communication with the pair of longitudinal sub-chambers or passages of the rotary valve member now to be described.

13 designates the rotary valve member or shell of the present improvement, of a length approximating the length of the cavity of the valve housing 9 and having a turning fit therein. To such end the outer shell of said valve member 13, and the cavity of the valve housing 9 will have a circular form in cross-section and the ordinary cylindrical or slightly tapering form longitudinally. In the present improvement the rotary valve member 13 is operatively connected to the main shaft of the engines by suitable intermediate speed reducing gearing, and receives rotation from such engine shaft at the rate of one revolution of the valve to four revolutions of the engine shaft. As a consequence, the relative speed of revolution of the valve member is slow as compared with that of the engine shaft, with a corresponding reduction in the wear of the valve parts and without a decrease in the efficiency in the operation of the valve member.

14 designates a central spirally arranged or twisted web or partition extending longitudinally to the bore or cavity of the rotary valve member 13, and dividing the same into a pair of longitudinal sub-chambers or passages 15 and 16, which have a twisted or spiral formation corresponding with that of the web or partition 14 aforesaid. Said sub-chambers or passages 15, 16, are adapted to alternately register with the fuel inlet passage 12, aforesaid, and each sub-chamber or passage is adapted to remain in communication with said fuel inlet passage during a one-half revolution, approximately, of the valve member 13. At its mid-length the circular shell of the rotary valve member 13 is formed with a series of slits or openings at each side of the spiral partition 14 aforesaid, as shown in Figs. 1, 2 and 5, which are adapted to register the fuel inlet passage 12 with one or the other of the sub-chambers or passages 15, 16, during a half revolution, approximately, of the rotary valve member, and accordingly, when one of said sub-chambers or passages is in communication with the fuel inlet passage 12, to supply fuel charges to the series of engine cylinders, the companion sub-chamber or passage and its individual accessories, is in a dormant condition owing to the fact that said sub-chamber or passage is cut off from the aforesaid fuel inlet passage 12 during such portion of the revolution of the rotary valve member.

17, 18, 19 and 20 designate a series of transverse ducts or passages extending diametrically through the rotary valve member 13, with their walls forming portions of the spiral web or partition 14 aforesaid. Said ducts or passages 17, 18, 19, 20, are disposed in spaced relation corresponding with that of the series of inlet-outlet ports 10, and companion series of outlet ports 11, of the valve housing 9 and with each of said transverse ducts or passages individual to companion ports 10 and 11 aforesaid.

21, 22, 23 and 24 designate duplicate series of ports or passages formed in the shell of the rotary valve member 13, and each of said series of ports or passages are individual to a sub-chamber or passage 15 or 16, heretofore described. Said duplicate series of ports or passages 21, 22, 23, 24, are disposed in spaced relation corresponding with that of the inlet-outlet ports 10 of the engine cylinders 5, 6, 7 and 8, and are adapted to register with said inlet-outlet ports at proper intervals in the continued operation of the engine. And as stated above in connection with the longitudinal sub-chambers or passages 15, 16, one series of said ports or passages 21, 22, 23, 24, will be dormant while the other series is active and the change from a dormant to an active condition will alternate once in each revolution of the rotary valve member.

In the present improvement the series of transverse ducts or passages 17, 18, 19 and 20, as well as the companion duplicate series of ports or passages 21, 22, 23 and 24 are disposed in angular relation to each other in their direction of circular movement within the valve housing 9, and with each individual set of transverse ducts and passages, one eighth of the circumference of a circle, in advance of the next succeeding set of transverse ducts and passages and such advance corresponding with the advance or twist of the web or partition 14 and the pair of longitudinal sub-chambers or passages 15, 16, above described.

With the above described arrangement and formation of parts, and with first piston 3, Figs. 1 and 3, at the beginning of its explosion or power stroke, as shown in the drawings, the transverse duct 19 and the passage 23 individual to the combustion chamber of said piston 3 will be out of register with the inlet-outlet port 10 of said combustion chamber. At the same time, the second piston 1, Figs. 1 and 4, is at the beginning of a fuel inlet or suction stroke, with its transverse duct 17 out of register with the inlet-outlet port 10 of the combustion chamber of said piston 1, and with one of the passages 21 commencing to register with said inlet-outlet port 10. At the same time the third piston 4, Figs. 1 and 6 is at the beginning of its fuel compressing stroke, the transverse duct 20 and passage 24 individual to the combustion chamber of said piston 4, out of register with the inlet-outlet port 10 of said combustion chamber. At the same time the fourth piston 2 is at the beginning of its outlet or exhaust stroke, with the passage 22 out of register with the inlet-outlet port 10 of the combustion chamber of said piston 2, and with the transverse duct 18 commencing to register with said inlet-outlet port 10.

Having thus fully described my said invention what I claim as new and desire to secure by Letters Patent is:—

1. In combination, a plurality of cylinders and pistons common to a single engine shaft, a valve housing common to the plurality of cylinders and having inlet-outlet ports communicating individually with the combustion chambers of said cylinders, said valve housing having a single inlet port for gaseous fuel and a plurality of individual outlet ports, and a rotary valve member disposed longitudinally in said valve housing and comprising a partitioned shell providing a pair of longitudinal chambers adapted for alternate registry with the single inlet port of the valve housing and having series of ports adapted to register with the inlet-outlet ports of the combustion chambers, said shell having a series of transverse ducts individual to the inlet-outlet ports of the combustion chambers and outlet ports of the valve housing, substantially as set forth.

2. In combination, a plurality of cylinders and pistons common to a single engine shaft and having a centrally spaced relation, a valve housing common to the plurality of cylinders and having inlet-outlet ports communicating individually with the combustion chambers of said cylinders, said valve housing being provided with a single inlet port disposed adjacent to the central space between the aforesaid cylinders and with a plurality of individual outlet ports, and a rotary valve member disposed longitudinally in said valve housing and comprising a partitioned shell providing a pair of longitudinal chambers adapted for alternate registry with the single inlet port of the valve housing and having series of ports adapted to register with the inlet-outlet ports of the combustion chambers, said shell having a series of transverse ducts individual to the inlet-outlet ports of the combustion chambers and outlet ports of the valve housing, substantially as set forth.

3. In combination, duplicate series of cylinders and pistons common to a single engine shaft and having a centrally spaced relation, a valve housing common to the plurality of cylinders and having inlet-outlet ports communicating individually with the combustion chambers of said cylinders, said valve housing being provided with a single inlet port disposed adjacent to the central space between the aforesaid cylinders and with a plurality of individual outlet ports, and a rotary valve member disposed longitudinally in said valve housing and comprising a partitioned shell providing a pair of longitudinal chambers adapted for alternate registry with the single inlet port of the valve housing and having series of ports adapted to register with the inlet-outlet ports of the combustion chambers, said shell having a series of transverse ducts individual to the inlet-outlet ports of the combustion chambers and outlet ports of the valve housing, substantially as set forth.

4. In combination, a plurality of cylinders and pistons common to a single engine shaft, a valve housing common to the plurality of cylinders and having inlet outlet ports communicating individually with the combustion chambers of said cylinders, said valve housing having a single inlet port for gaseous fuel and a plurality of individual outlet ports, and a rotary valve member disposed longitudinally in said valve housing and comprising a circular shell and a spiral partition in said shell providing a pair of longitudinal chambers adapted for alternate registry with the single inlet port of the valve housing and having a series of ports adapted to register with the inlet-outlet ports of the combustion chamber, said shell having a series of transverse ducts adapted to individually register the inlet-outlet ports of the combustion chamber with the outlet ports of the valve housing, substantially as set forth.

5. In combination, a plurality of cylinders and pistons common to a single engine shaft and having a centrally spaced relation, a valve housing common to the plurality of cylinders and having inlet-outlet ports communicating individually with the combustion chambers of said cylinders, said valve housing being provided with a single inlet port disposed adjacent to the central space between the aforesaid cylinders and with a plurality of individual outlet ports, and a rotary valve member disposed longitudinally in said valve housing and comprising a circular shell and a spiral partition in said shell providing a pair of longitudinal chambers adapted for alternate registry with the single inlet port of the valve housing and having series of ports adapted to register with the inlet-outlet ports of the combustion chambers, said shell having a series of transverse ducts adapted to individually register the inlet-outlet ports of the combustion chambers with the outlet ports of the valve housing, substantially as set forth.

6. In combination, duplicate series of cylinders and pistons common to a single engine shaft and having a central spaced relation, a valve housing common to the plurality of cylinders and having inlet-outlet ports communicating individually with the combustion chambers of said cylinders, said valve housing being provided with a single inlet port disposed adjacent to the central space between the aforesaid cylinders and with a plurality of individual outlet ports, and a rotary valve member disposed longitudinally in said valve housing and comprising a circular shell and a spiral partition in said shell providing a pair of longitudinal chambers adapted for alternate registry with the single inlet port of the valve housing and having a series of ports adapted to register with the inlet-outlet ports of the combustion chambers, said shell having a series of transverse ducts adapted to individually register the inlet-outlet ports of the combustion chambers with the outlet ports of the valve housing, substantially as set forth.

Signed at Chicago, Illinois, this 14th day of April, 1915.

JAMES SHAW.